United States Patent [19]
Horiuchi et al.

[11] Patent Number: 5,729,310
[45] Date of Patent: Mar. 17, 1998

[54] LIGHTING APPARATUS

[75] Inventors: Kenji Horiuchi, Tsuzuki-gun; Akira Murakami, Yamatokoriyama, both of Japan

[73] Assignee: Sharp Kabushiki Kaisha, Osaka, Japan

[21] Appl. No.: 725,396

[22] Filed: Oct. 3, 1996

[30] Foreign Application Priority Data

Nov. 20, 1995 [JP] Japan ................... 7-301058

[51] Int. Cl.[6] ................... G02F 1/1333; G02F 1/1335
[52] U.S. Cl. ................... 349/62; 349/58; 349/64
[58] Field of Search ................... 349/58, 62, 64

[56] References Cited

U.S. PATENT DOCUMENTS

| | | | |
|---|---|---|---|
| 5,166,815 | 11/1992 | Elderfield | 359/49 |
| 5,375,005 | 12/1994 | Kamano | 359/48 |
| 5,432,626 | 7/1995 | Sasuga et al. | 359/83 |
| 5,619,351 | 4/1997 | Funamoto et al. | 349/61 |

FOREIGN PATENT DOCUMENTS

| | | |
|---|---|---|
| 194515 | 8/1991 | Japan . |
| 28049 | 1/1995 | Japan . |

*Primary Examiner*—William L. Sikes
*Assistant Examiner*—Julie Ngo
*Attorney, Agent, or Firm*—Nixon & Vanderhye P.C.

[57] ABSTRACT

A lighting apparatus constructed by holding a linear light source, a radiating plate, a reflecting plate, a light guiding plate, a diffusing plate, and a lens between upper and lower frames. One of the upper and lower frames is provided with pins. The other frame, the radiating plate, the reflecting plate, the light guiding plate, the diffusing plate and the lens have holes in locations corresponding to the pins. The upper and lower frames have protrusions and recessions into which the protrusions are fitted, respectively. The lighting apparatus is easily assembled without using vises by fitting the pins into the holes of the respective component members to place them in position and engaging the protrusions and the recessions of the upper and lower frames. Moreover, a harness of the linear light source is inserted into a slit formed on a surface of the upper frame which does not face the linear light source, and fixed by a stopper. It is thus possible to provide a lighting apparatus with excellent maintainability at reduced costs.

12 Claims, 10 Drawing Sheets

LIGHTING APPARATUS

FIELD OF THE INVENTION

The present invention relates to lighting apparatuses used for lightening audio and visual equipment and advertisement display devices, and more particularly relates to a lighting apparatus used as a light source in a liquid crystal display device.

BACKGROUND OF THE INVENTION

In the field of information terminals such as notebook personal computers and notebook word processors in which their portability is of great importance, lighting apparatuses of sidelight type have been widely used as lighting apparatuses for transmissive or semi-transmissive liquid crystal display devices.

Figure 7:
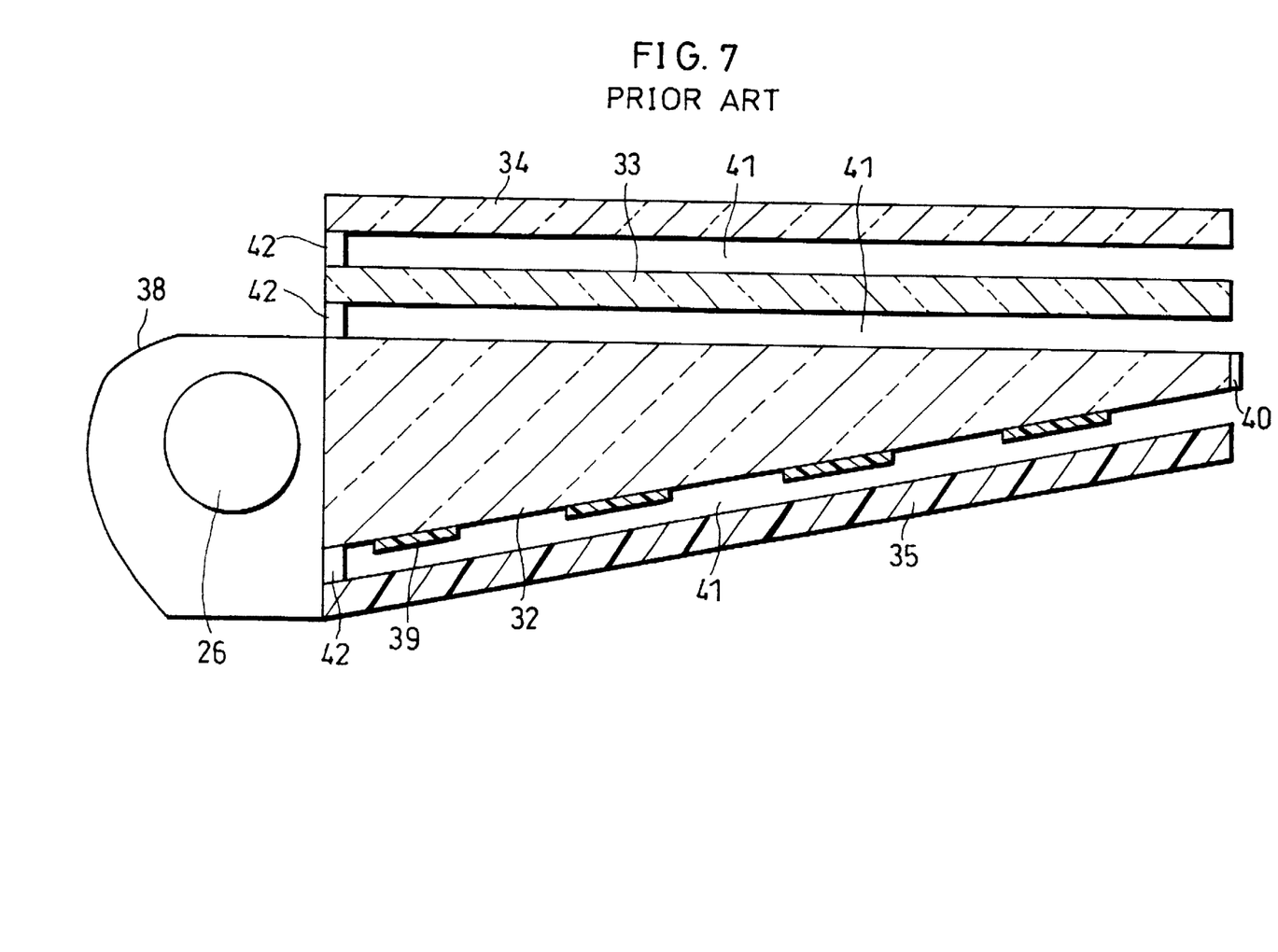
FIG. 7 is a cross section illustrating the structure of a conventional lighting apparatus.

As shown in FIG. 7, a typical structure of a conventional lighting apparatus of sidelight type includes at least a wedge or flat light guiding plate 32, a linear light source 26, a reflector 38, a lens 34, a diffusing plate 33, a diffusion reflecting layer 39, and a reflecting plate 35.

The light guiding plate 32 is formed by a light transmitting member such as acrylic material, and is disposed so that light emitted by the linear light source 26 strikes an end surface thereof. The reflector 38 is made of a reflecting sheet with high reflectance such as a silver deposited film formed by depositing silver and aluminum on a film of polyethylene terephthalate, and plastics with highly reflectance.

The lens 34 is formed by, for example, a fine prism sheet using one or two pieces of polycarbonate. The diffusing plate 33 is formed by polyethylene terephthalate, etc. The diffusion reflecting layer 39 is patterned with ink, or embossed to form a raised pattern. The reflecting plate 35 is formed by, for example, a white polyethylene terephthalate sheet or a metal plate painted white.

The linear light source 26 is disposed in the vicinity of at least one end of the light guiding plate 32. The diffusing plate 33 is placed on one side of the light guiding plate 32, and the diffusion reflecting layer 39 is formed on the other side of the light guiding plate 32. The reflecting plate 35 and the reflecting layer 40 are disposed on the side of the light guiding plate 32 where the diffusion reflecting layer 39 is formed and on an end surface thereof opposite the linear light source 26, respectively.

An air layer 41 is present between the linear light source 26 and the light guiding plate 32, between the light guiding plate 32 and the reflecting plate 35, and between the lens 34 and the diffusing plate 33 to separate them from each other. The light guiding plate 32 and the reflecting plate 35, the lens 34 and the diffusing plate 33, and the diffusing plate 33 and the light guiding plate 32 are fixed to each other respectively by a pressure-sensitive adhesive double coated tape 42 or ultrasonic welding.

Figure 8:
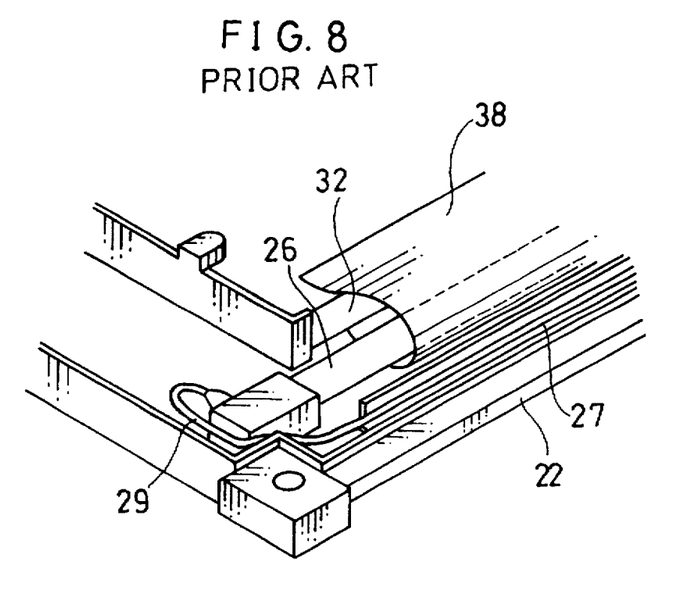
FIG. 8 is a perspective view illustrating a state in which a harness of a linear light source in the conventional lighting apparatus is fixed.

Methods of assembling the lighting apparatus are explained below. As illustrated in FIG. 8, a harness 29 is fitted into a slit 27 provided to fix the harness 29. The slit 27 is formed in a lower frame 22 in the proximity of the linear light source 26.

Figure 9:
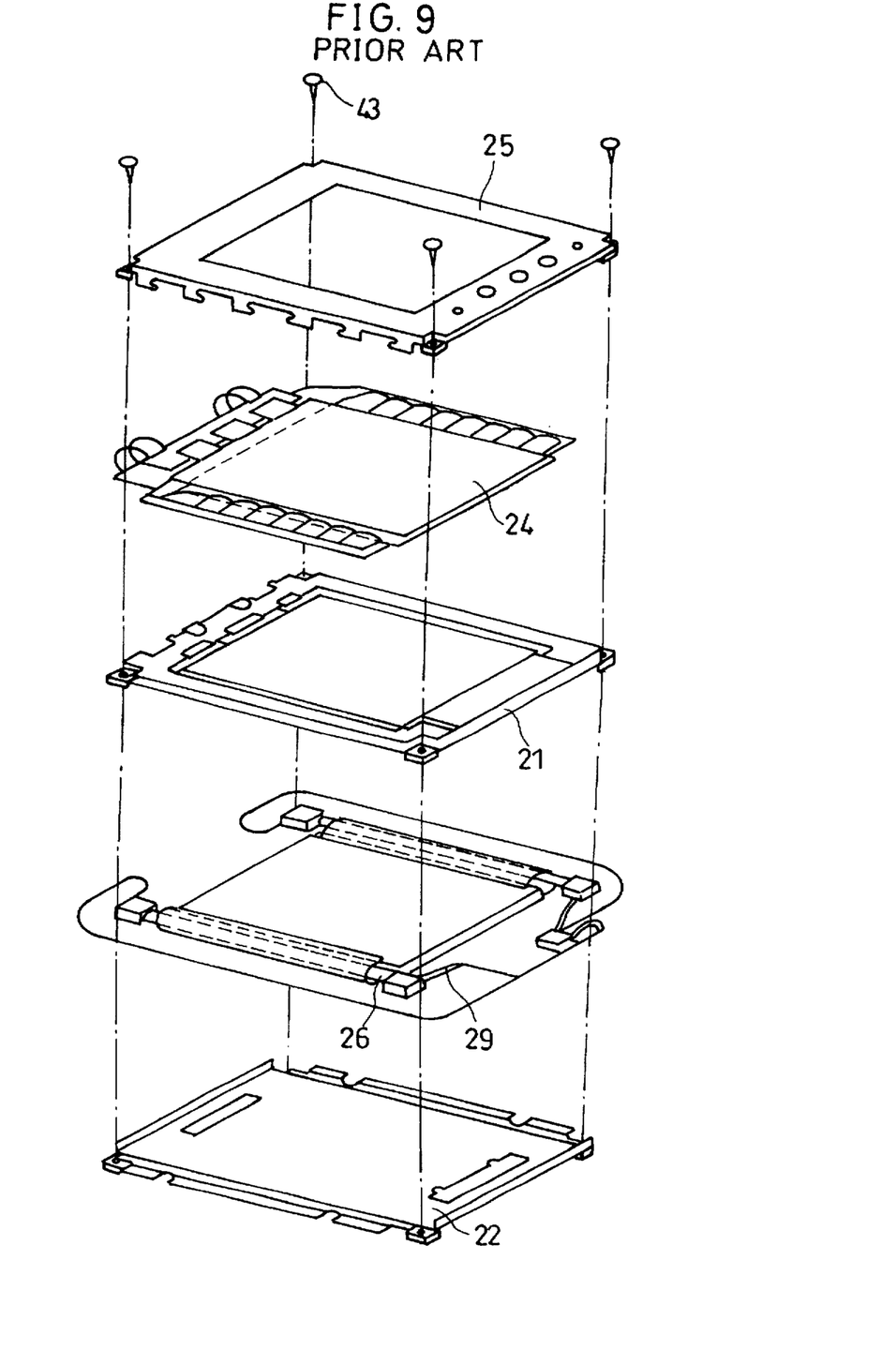
FIG. 9 is a perspective view illustrating the structure of liquid crystal display device incorporating the conventional lighting apparatus.

Next, as illustrated in FIG. 9, the component members of the lighting apparatus, such as the lens 34, the diffusing plate 33, the light guiding plate 32, and the reflecting plate 35, are sandwiched between the lower frame 22 and an upper frame 21. Subsequently, the component members and a liquid crystal display panel 24 are covered with a housing 25, and fixed with vises 43. Alternatively, the component members may be sandwiched between the upper frame 21 and the lower frame 22, temporarily fixed with vises (not shown), covered with the housing 25 together with the liquid crystal display panel 24, and then fixed with the vises 43.

Figure 10:
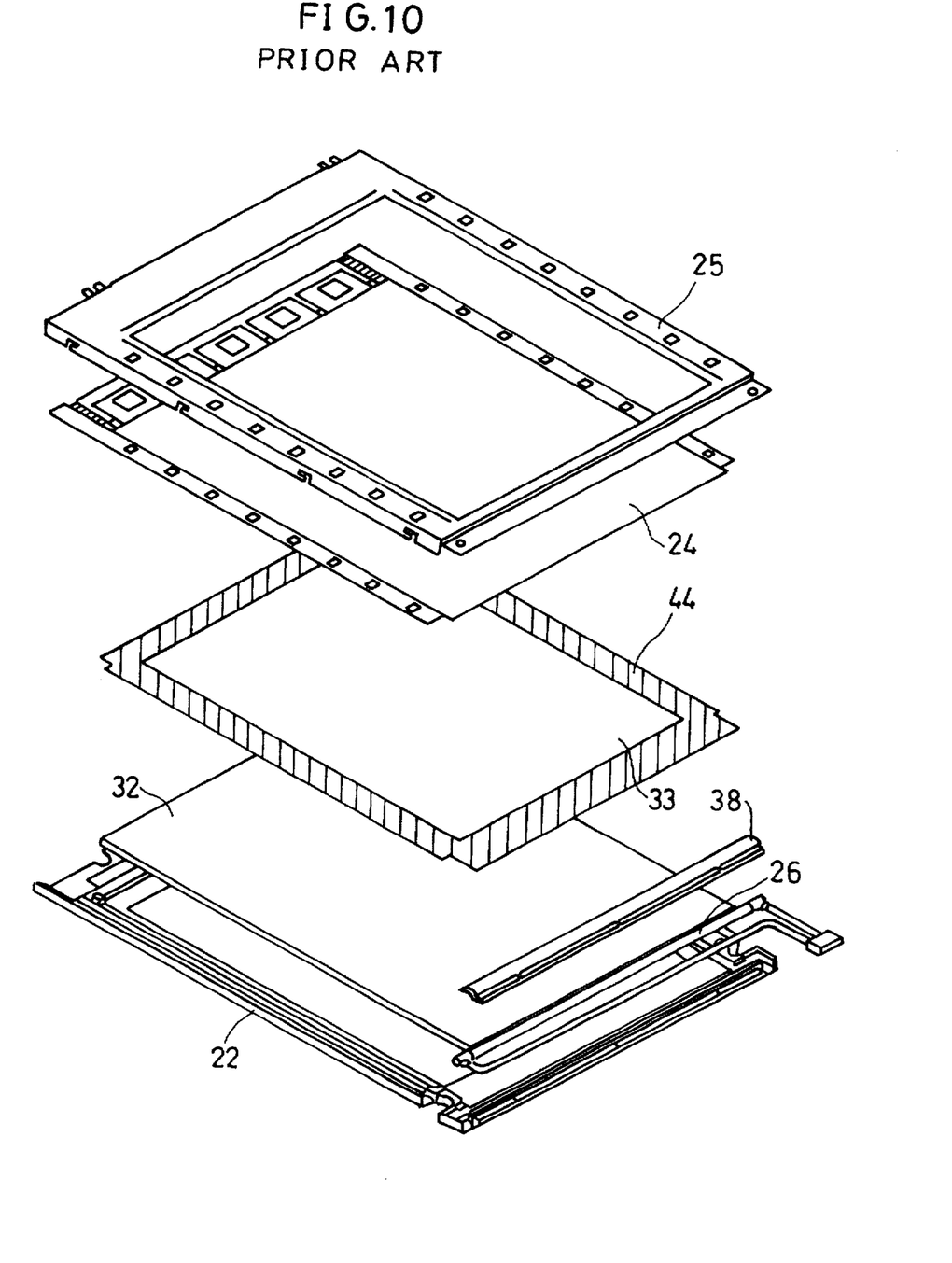
FIG. 10 is a perspective view illustrating the structure of the liquid crystal display device incorporating the conventional lighting apparatus in which a light blocking member is disposed.

In this case, in order to prevent leakage of light from the lighting apparatus, a light blocking member 44 made of a black adhesive material is fastened to a portion of the diffusing plate 33 adjacent to the non-display area of the liquid crystal display panel 24 as shown in FIG. 10. The light blocking member 44 prevents leakage of light from the four side edges of the emergent surface of the lighting apparatus.

However, in the conventional configuration, when the component members of the lighting apparatus, such as the lens 34, the diffusing plate 33, the light guiding plate 32, and the reflecting plate 35, are sandwiched between the upper frame 21 and the lower frame 22, covered with the housing 25 together with the liquid crystal display panel 24 and then fixed, positioning the respective component members takes quite a time, and maintenance thereof is difficult.

Similarly, the assembling method in which the component members of the lighting apparatus are sandwiched between the upper frame 21 and the lower frame 22 and then temporarily fixed suffers from drawbacks that the number of assembling steps and the manufacturing cost increase.

Moreover, when fitting the harness 29 into the slit 27 formed in the lower frame 22 in the proximity of the linear light source 26, pressure may be applied to the linear light source 26 and the linear light source 26 may be broken because the linear light source 26 and the slit 27 are too close to each other.

Further, in the structure in which black adhesive material is fastened to the diffusing plate 33 to absorb light so as to prevent leakage of light from the non-display area on the edges of the lighting apparatus, it is difficult to accurately fasten the adhesive material to the diffusing plate 33. Namely, the adhesive material may spread into the display area, or adhere to the display region of the diffusing plate 33. As a result, the quality of the lighting apparatus deteriorates.

In addition, in the case where the component members of the lighting apparatus, such as the lens 34, the diffusing plate 33, the light guiding plate 32 and the reflecting plate 35, are successively fastened and then fixed, the component members are usually fixed using the pressure-sensitive adhesive double coated tape 42 or by ultrasonic welding in a prior art. However, if an adhesive material, for example, the pressure-sensitive adhesive double coated tape 42, is used, both the thickness of the lighting apparatus and the manufacturing cost increase. With the use ultrasonic welding, although the thickness of the lighting apparatus is made thin, the manufacturing cost further increases.

SUMMARY OF THE INVENTION

It is an object of the present invention to provide a lighting apparatus with excellent maintainability at reduced costs.

In order to achieve the above object, a lighting apparatus of the present invention includes:

a linear light source;

a light guiding plate having an incident surface on which light from the linear light source is incident, and an emergent surface from which the incident light emerges; and an upper frame and a lower frame for holding the linear light source and the light guiding plate therebetween, wherein the upper frame and the lower frame are fixed to each other by at least a pair of a protrusion produced on one of the upper and lower frames and a recession formed on the other frame to engage with the protrusion.

3

In this structure, the lighting apparatus is easily assembled without using vises by holding at least the linear light source and the light guiding plate between the upper and lower frames and engaging the protrusions and recessions formed on the upper and lower frames. It is thus possible to simplify the manufacturing processes, reduce the cost, and provide a lighting apparatus with excellent maintainability.

In this lighting apparatus, if the light source includes a harness and fixing means for fixing the harness is provided on a surface of the upper frame which does not face the light source, unlike a conventional structure, such a fine work as fixing the harness in a narrow space crowded with the component members of the lighting apparatus is not necessary, thereby simplifying the work for fixing the harness. Moreover, since the upper frame functions as a cover of the linear light source, it is possible to prevent the linear light source from being broken by pressure exerted when fixing the harness.

A preferred embodiment of this structure is characterized by fixing means which includes a slit formed on the upper frame, and a stopper for restraining the harness inserted into the slit from coming out of the slit. In this embodiment, since the harness is fixed by simply inserting the harness into the slit, it is possible to simplify the manufacturing processes and reduce the cost.

If the above-mentioned lighting apparatus further includes a light diffusing member layered on the emergent surface of the light guiding plate, a reflecting member layered on a surface opposite the emergent surface, a pin formed at least on one of the upper and lower frames, and holes formed on the light diffusing member, light guiding plate and reflecting member in a location corresponding to the pin, positioning of these members is easily performed by successively fitting the pin into the holes formed on the light diffusing member, light guiding plate and reflecting member. This structure can further reduce the working time and simplify the manufacturing processes, thereby decreasing the cost. Moreover, the resulting lighting apparatus has improved maintainability.

In this lighting apparatus, if the upper frame is made from a light reflecting material and a portion thereof covering the linear light source is formed in a shape corresponding to the shape of the linear light source, it is possible to prevent leakage of light without using a light blocking member or reflector that is used in a prior art. As a result, the number of parts in the lighting apparatus is decreased, and therefore the size and cost of the apparatus can be reduced.

For a fuller understanding of the nature and advantages of the invention, reference should be made to the ensuing detailed description taken in conjunction with the accompanying drawings.

4

DESCRIPTION OF THE PREFERRED EMBODIMENT

The following description will discuss one embodiment of the present invention with reference to FIGS. 1 to 6.

First, referring to FIGS. 1 to 6, the component members of a lighting apparatus of this embodiment will be explained.

Figure 2:
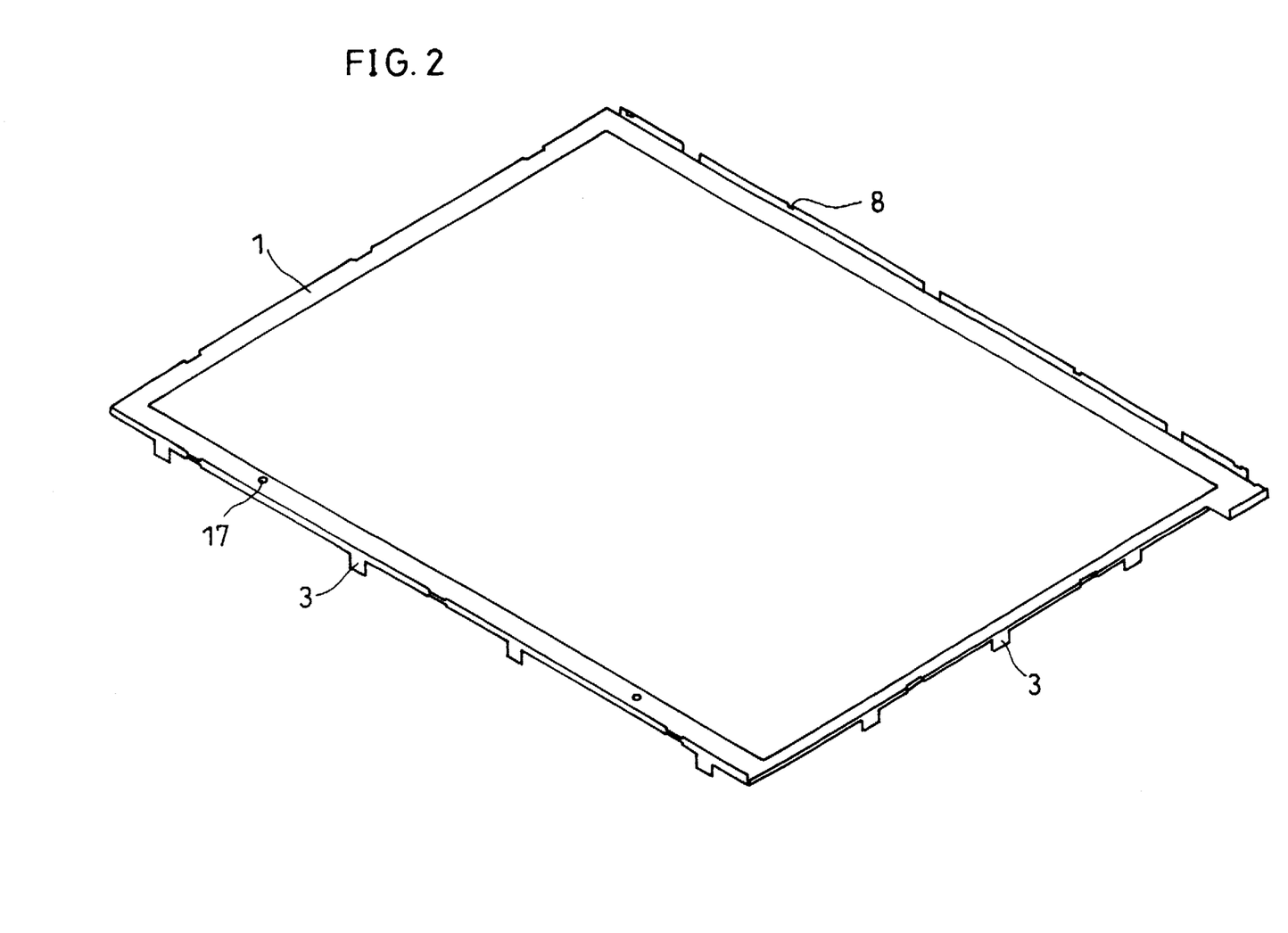
FIG. 2 is a perspective view illustrating the structure of an upper frame of the lighting apparatus.
Figure 3:
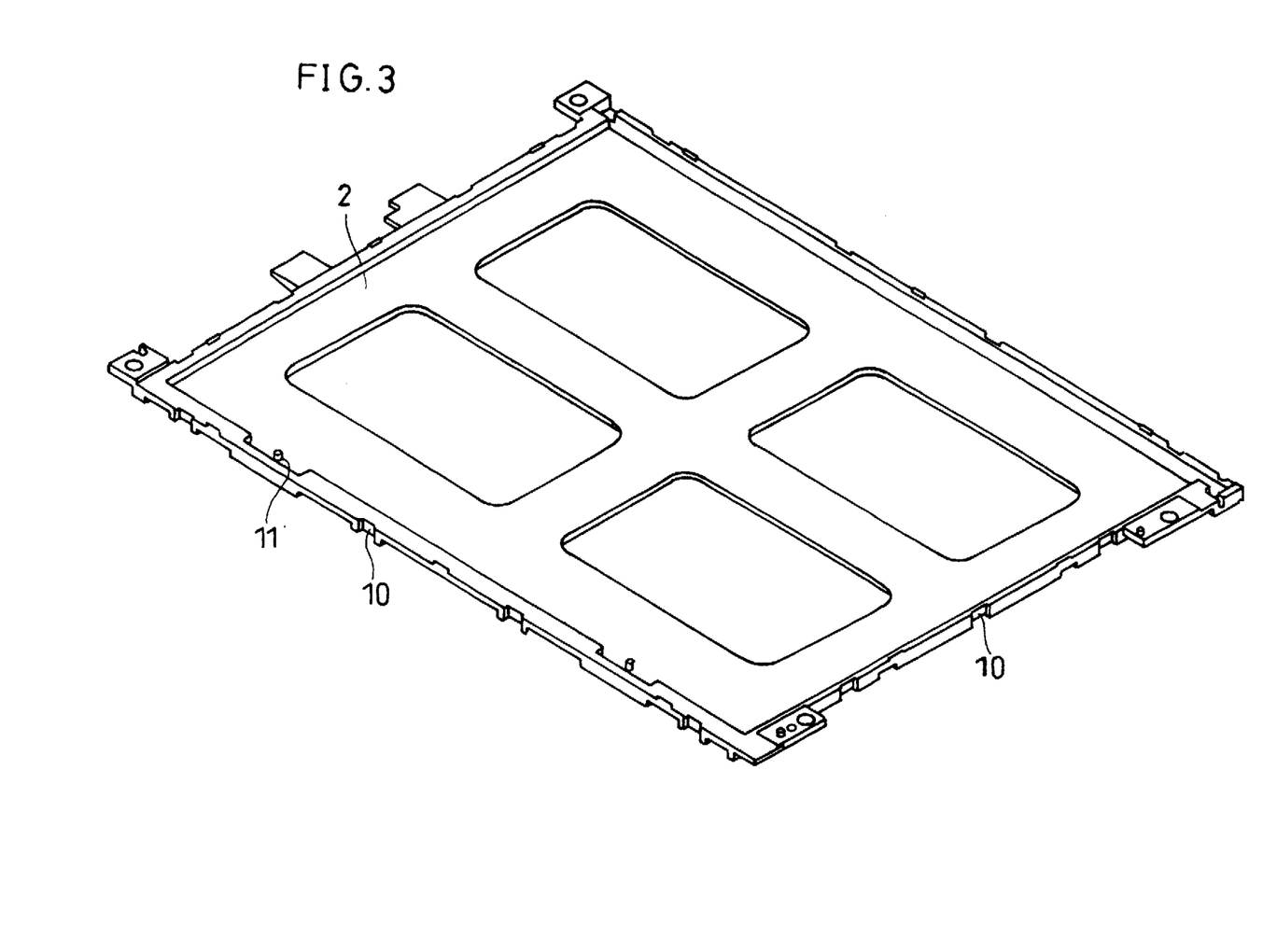
FIG. 3 is a perspective view illustrating the structure of a lower frame of the lighting apparatus.
Figure 4:
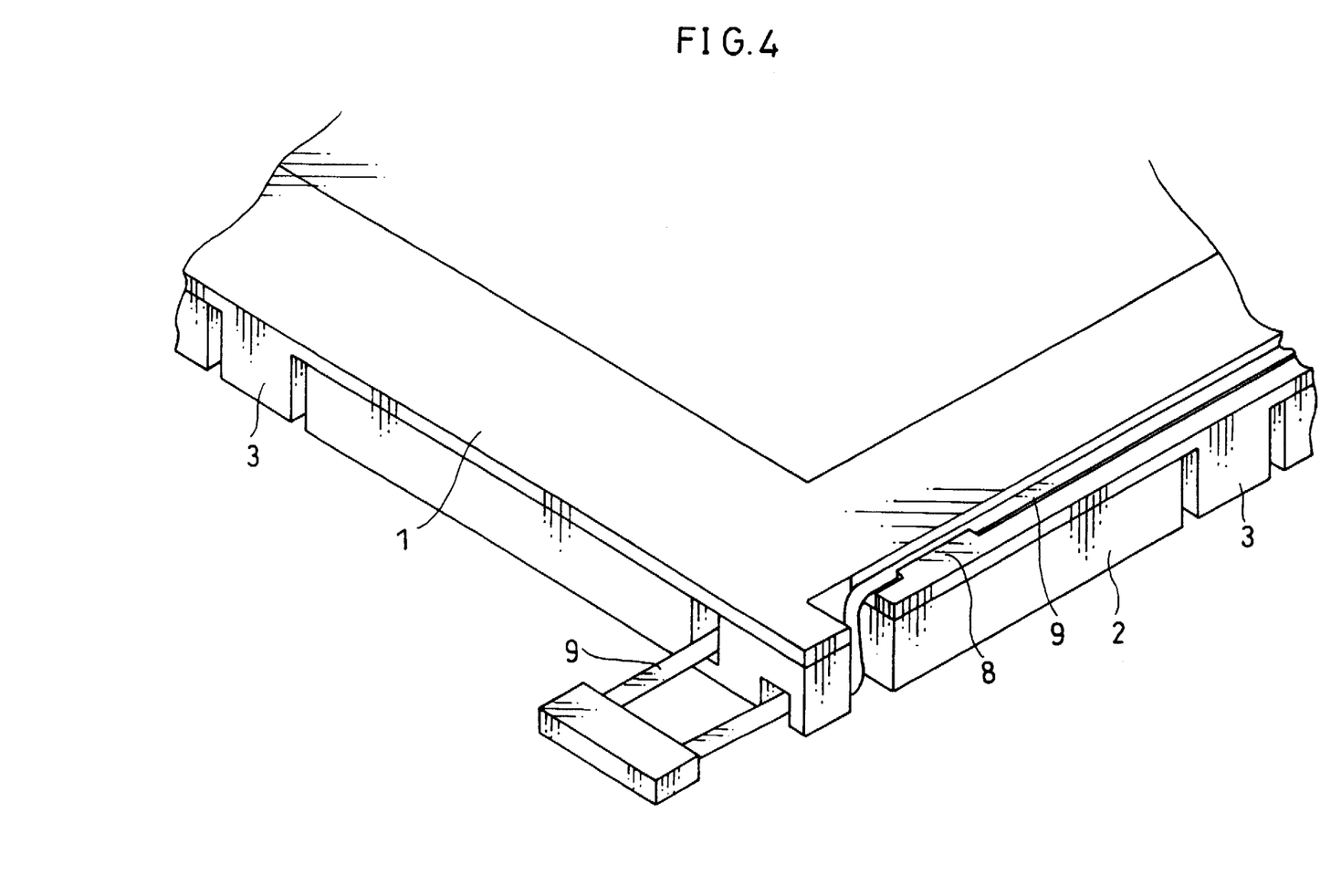
FIG. 4 is a perspective view illustrating a state in which a harness of a linear light source in the lighting apparatus is fixed.
Figure 6:
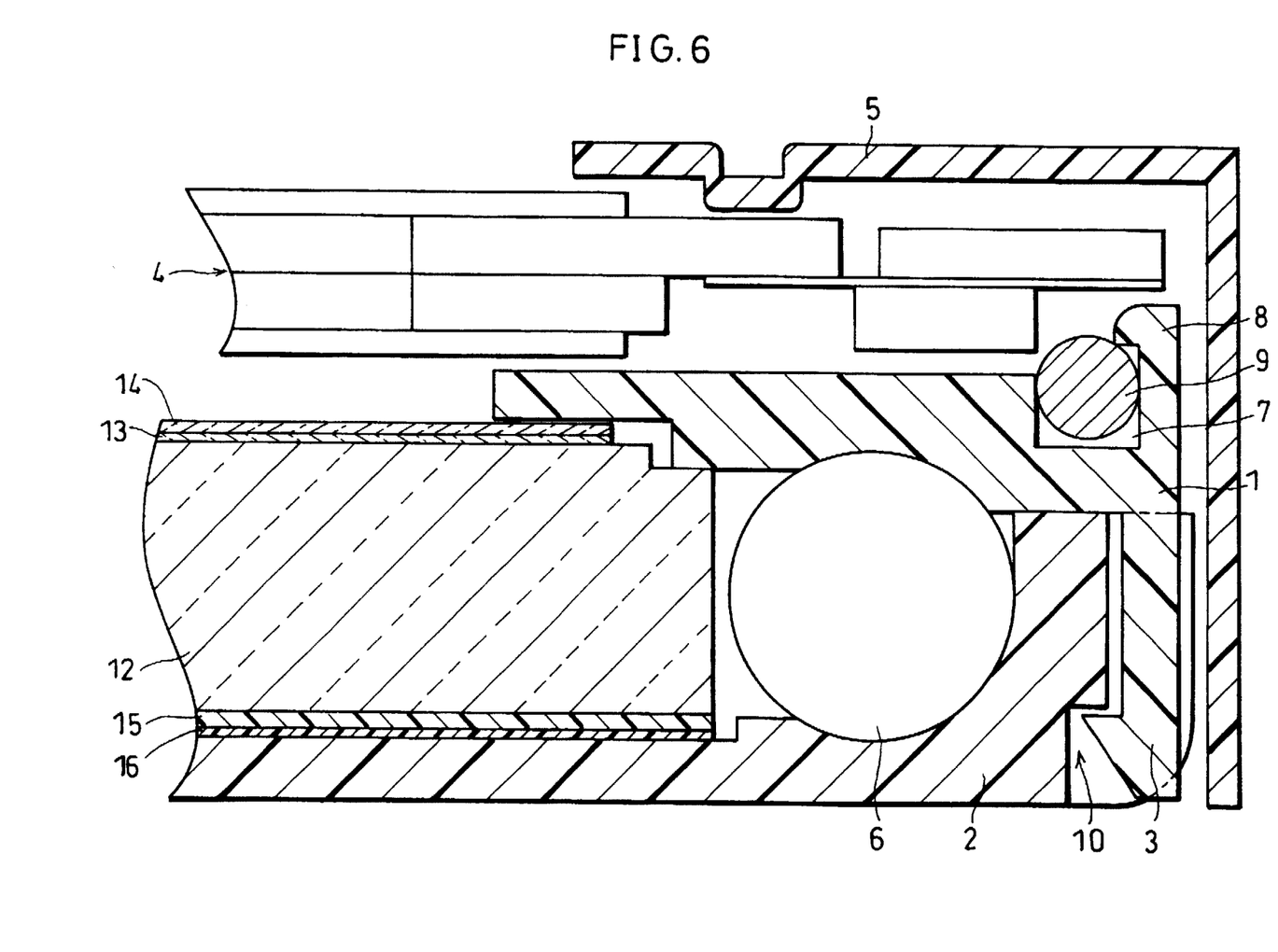
FIG. 6 is a cross section of the liquid crystal display device.

As illustrated in FIG. 6, in the structure of the lighting apparatus of this embodiment, a linear light source 6, a light guiding plate 12, a diffusing plate 13, a lens 14, a reflecting plate 15, and a radiating plate 16 are sandwiched between an upper frame 1 and a lower frame 2. As illustrated in FIG. 2, produced at the edges of the upper frame 1 are protrusions 3 which each have a barb at the end (see FIG. 6) to snap engage with the recesses 10 in lower frame 2. As illustrated in FIG. 3, recessions 10 into which the protrusions 3 of the upper frame 1 fitted are formed on the lower frame 2 in locations corresponding to the protrusions 3.

In this configuration, since the upper frame 1 and the lower frame 2 are fixed to each other by fitting the protrusions 3 with their barbed ends into the recessions 10, the above-mentioned lighting apparatus can be constructed without using vises that are necessary in a prior art. Hence, this configuration can reduce the number of assembling steps. Moreover, the above-mentioned lighting apparatus has improved maintainability. Further, for example, when a liquid crystal display device is formed by combining this lighting apparatus and a liquid crystal display panel 4 as shown in FIG. 6, positioning can be easily performed. Namely, the liquid crystal display device can be constructed by simply layering the lighting apparatus and the liquid crystal display panel 4, covering them with a housing 5, and fastening them with vises.

In addition, as illustrated in FIG. 6, provided on a surface of the upper frame 1 which does not face the linear light source 6 are a slit 7 and a stopper 8 for fixing a harness 9 of the linear light source 6. Unlike a conventional structure, since this structure does not require such a fine work as fixing the harness in a narrow space crowded with the components members of the lighting apparatus, it is possible to easily fix the harness 9 after constructing the lighting apparatus. Namely, the process of fixing the harness can be simplified. Moreover, since the upper frame 1 functions as a cover of the linear light source 6, the linear light source 6 can never be broken by pressure exerted when fastening the harness 9. In a more preferred structure which more perfectly prevents the linear light source 6 from being broken by pressure, a space as small as about 1 mm (not shown) is produced between the linear light source 6 and the upper frame 1.

The upper frame 1 is made from a material with high reflecting characteristics which is formed by mixing about 10 percent titanium oxide with polycarbonate. Moreover, when the color of the upper frame 1 is made white, the upper frame 1 has both reflecting and light blocking properties. Furthermore, a portion of the upper frame 1 covering the linear light source 6 is formed in a shape corresponding to the shape of the linear light source 6. Namely, the upper frame 1 blocks light travelling in an upward direction (toward the upper frame 1) from the linear light source 6. Consequently, when a liquid crystal display device is constructed by disposing the lighting apparatus on the back side of the liquid crystal display panel 4 as shown in FIG. 6, leakage of light from the non-display area of the liquid crystal display panel 4 can be prevented. Shortly, the lighting apparatus of this embodiment eliminates the necessity of using a light blocking member or a reflector that is required in a conventional structure.

Figure 1:
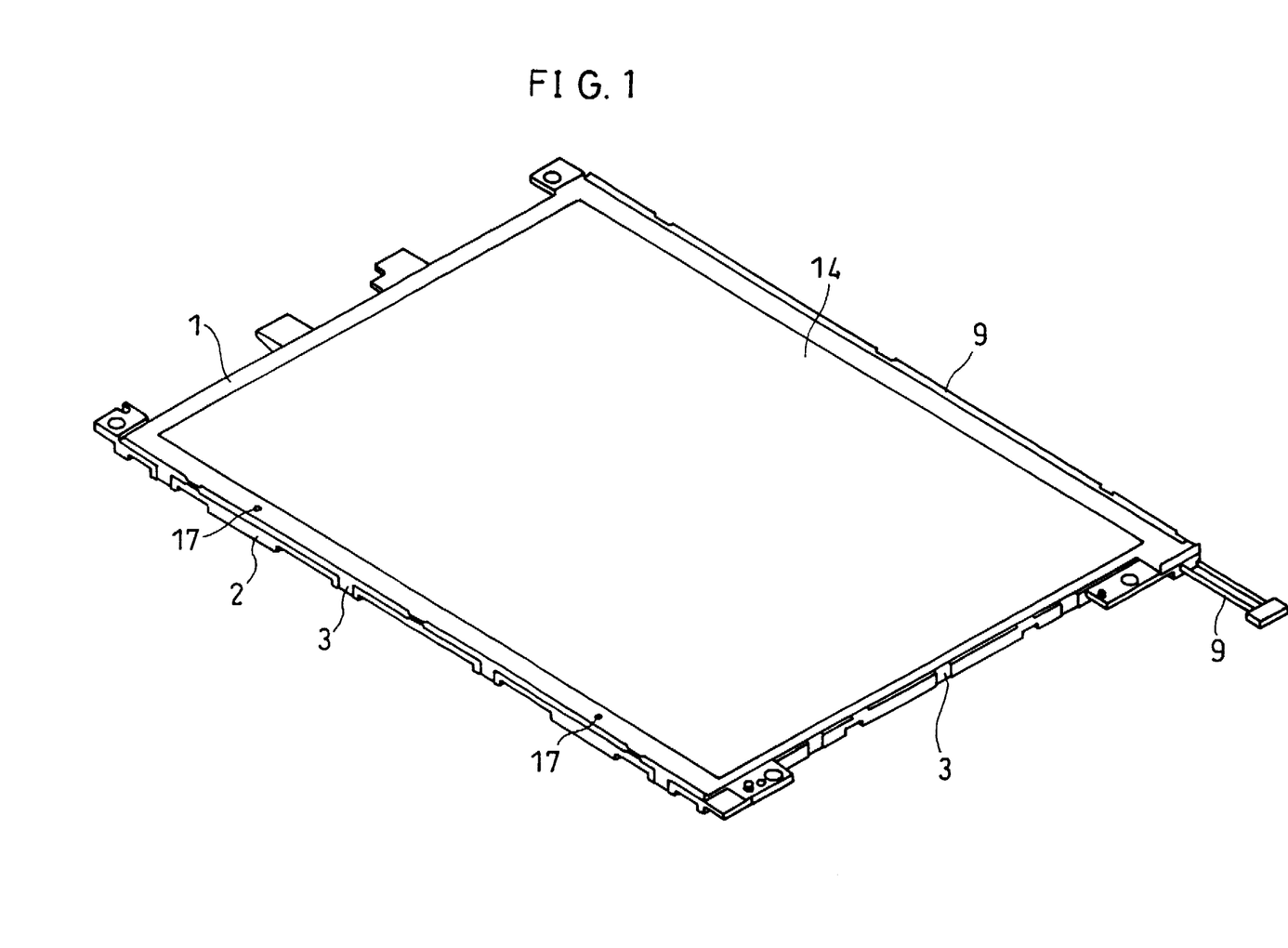
FIG. 1 is a perspective view illustrating the structure of a lighting apparatus according to one embodiment of the present invention.

The lower frame 2 is made from polycarbonate. As illustrated in FIG. 3, the recessions 10 that engage with the protrusions 3 of the upper frame 1 are formed on the lower frame 2 in locations corresponding to the protrusions 3. Additionally, the lower frame 2 is provided with pins 11 used for positioning and fixing the respective component members of the lighting apparatus. With the use of the pins 11, the component members of the lighting apparatus, such as the light guiding plate 12, the diffusing plate 13, the lens 14, the reflecting plate 15, and the radiating plate 16, can be placed in position. More specifically, unlike the conventional structure, in this structure, there is no need to fix the respective component members by a pressure-sensitive double coated adhesive tape or ultrasonic welding. As a result, the thickness of the lighting apparatus can be decreased, and the manufacturing cost can be reduced. Furthermore, if holes 17 are provided on the upper frame 1 in locations corresponding to the pins 11 as shown in FIG. 1, the holes 17 can be used for positioning purposes when fixing the upper frame 1 and the lower frame 2 by the engagement of the protrusions 3 and the recessions 10. Consequently, the working time is shortened.

Figure 5:
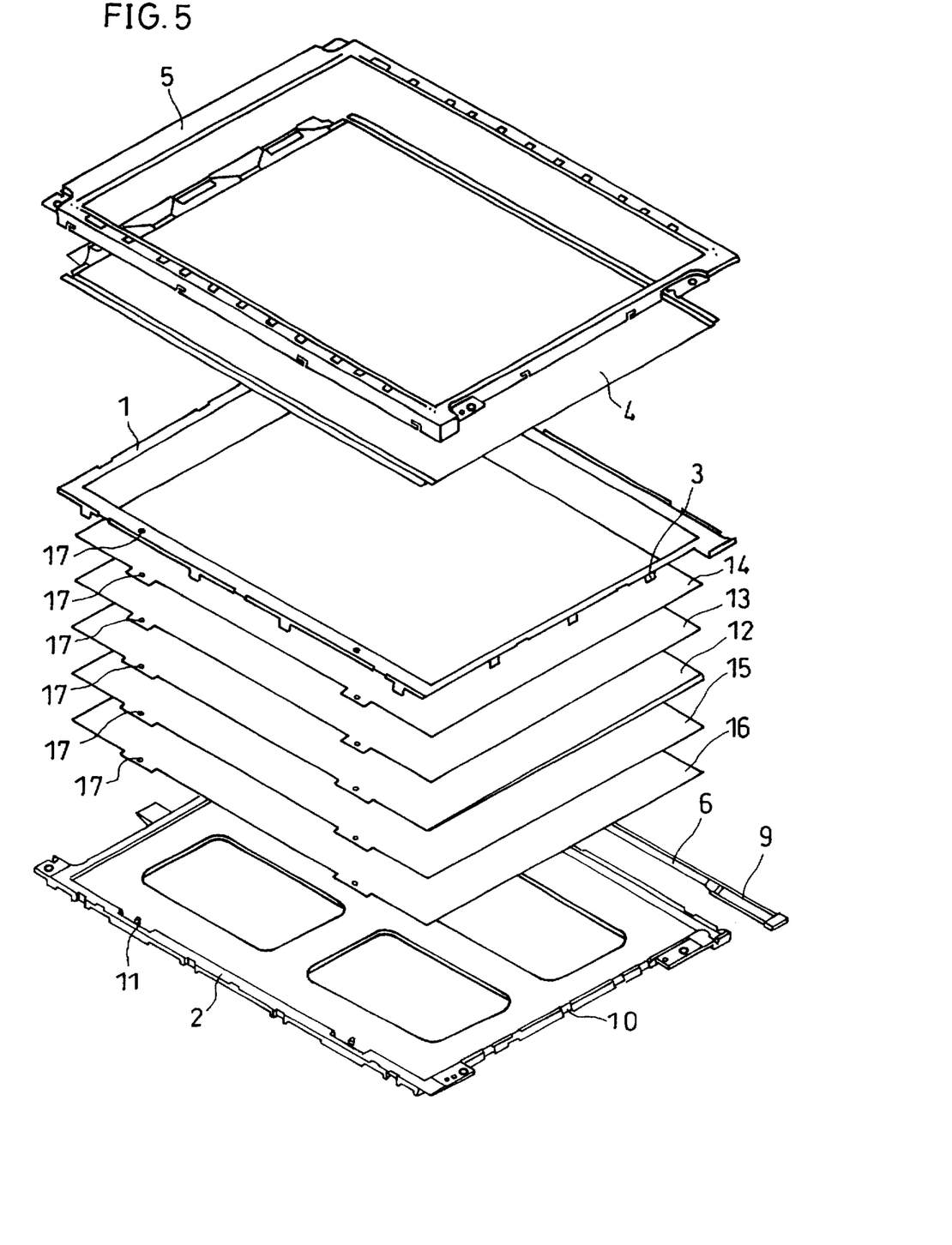
FIG. 5 is an exploded perspective view illustrating the structure of a liquid crystal display device incorporating the lighting apparatus.

The light guiding plate 12 is made from an acrylic resin by injecting molding. In this embodiment, the light guiding plate 12 has a shape of wedge with a thickness of 3.3 mm on the light incident side and a thickness of 1.2 mm on the opposite side. As illustrated in FIG. 5, an edge of the light guiding plate 12 has the holes 17 used for positioning and fixing the pins 11 of the lower frame 2. Moreover, a white dot pattern (not shown) functioning as a diffusion reflecting layer is printed on a surface of the light guiding plate 12 facing the lower frame 2.

As the diffusing plate 13, for example, "D118" (product name) manufactured by Tsujimoto Electric Co., Ltd. may be used. As the lens 14 for example, a lens sheet "BEF" produced by Sumitomo 3M Co., Ltd. may be used. As the reflecting plate 15, for example, a white polyethylene terephthalate sheet "E-60" of Toray Industries, Inc. may be used. As the radiating plate 16, for example, materials having high heat conductivity such as aluminum may be used.

As illustrated in FIG. 5, the holes 17 into which the pins 11 of the lower frame 2 are fitted are formed on the edges of the diffusing plate 13, the lens 14, the reflecting plate 15, and the radiating plate 16, in locations corresponding to the pins 11. The holes 17 formed in these members are of two types to cope with the deformation of the respective members due to heat. More specifically, some of the holes 17 are oval, and the rest are circular in shape. In this arrangement, positioning is performed using the circular holes 17, and deformation of the members due to thermal expansion is dealt with by the oval holes 17.

The linear light source 6 has an external diameter of 2.6 mm, and is disposed so that an air layer is present between an end surface of the light guiding plate 12 and the linear light source 6.

Next, the following description will discuss a method of assembling the lighting apparatus. First, positioning is performed by fitting the pins 11 of the lower frame 2 into the holes 17 of the radiating plate 16, reflecting plate 15, light guiding plate 12, diffusing plate 13 and lens 14 in this order. Thereafter, the linear light source 6 is disposed on the lower frame 2.

Subsequently, the positioning of the upper frame 1 and the lower frame 2 is performed by fitting the pins 11 of the lower frame 2 into the holes 17 of the upper frame 1, and then the upper frame 1 and the barbed lower frame 2 are fixed to each other by engaging the protrusions 3 of the upper frame 1 with the recessions 10 of the lower frame 2. Thereafter, the harness 9 of the linear light source 6 is inserted into the slit 7 in the upper frame 1 that is provided for fixing the harness 9, and fixed with the stopper 8.

By performing the above mentioned processes, the lighting apparatus is completed. Further, a liquid crystal display device can be fabricated by layering the liquid crystal display panel 4 on the lighting apparatus, covering them with the housing 5, and fixing them with vises (not shown).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting apparatus comprising:

a linear light source;

a light guiding plate having an incident surface on which light from said linear light source is incident, and an emergent surface from which the incident light emerges; and an upper frame and a lower frame for holding said linear light source and said light guiding plate therebetween, wherein said upper frame and said lower frame are fixed to each other by at least a pair of protrusions produced on one of said upper and lower frames and a recession formed on the other frame to engage with said protrusion, each said protrusion having a barb at its end.

2. The lighting apparatus as set forth in claim 1, wherein said light source includes a harness, and said upper frame has fixing means on a surface which does not face said light source, for fixing said harness.

3. The lighting apparatus as set forth in claim 2, wherein said fixing means includes a slit formed on said upper frame, and a stopper for restraining said harness inserted into said slit from coming out of said slit.

4. The lighting apparatus as set forth in claim 1, further comprising a light diffusing member layered on said emergent surface of said light guiding plate, and a reflecting member on a surface opposite said emergent surface, wherein at least one of said upper and lower frames is provided with a pin, and each of said light diffusing member, said light guiding plate, and said reflecting member has a hole in a location corresponding to said pin.

5. The lighting apparatus as set forth in claim 4, wherein said hole of at least one of said light diffusing member, said light guiding plate, and said reflecting member is oval.

6. The lighting apparatus as set forth in claim 4,
   wherein said light diffusing member includes a diffusing layer for diffusing light, and a lens layer having a fine prism.

7. The lighting apparatus as set forth in claim 1, further comprising a light diffusing member layered on said emergent surface of said light guiding plate, and a reflecting member layered on a surface opposite said emergent surface,
   wherein one of said upper and lower frames is provided with a pin, and
   each of the other frame, said light diffusing member, said light guiding plate, and said reflecting member has a hole in a location corresponding to said pin.

8. The lighting apparatus as set forth in claim 7,
   wherein said hole of at least one of said other frame, said light diffusing member, said light guiding plate, and said reflecting member is oval.

9. The lighting apparatus as set forth in claim 7,
   wherein said light diffusing member includes a diffusing layer for diffusing light, and a lens layer having a fine prism.

10. The lighting apparatus as set forth in claim 1, wherein said upper frame is made from a material that reflects light, and a portion thereof covering said linear light source is formed in a shape corresponding to a shape of said linear light source.

11. The lighting apparatus as set forth in claim 10,
    wherein said upper frame is made from a material which is formed by mixing about 10 percent titanium oxide with polycarbonate and colored white.

12. The lighting apparatus as set forth in claim 1,
    wherein a surface of said light guiding plate opposite said emergent surface has a white dot pattern for diffusing and reflecting light.

* * * * *